United States Patent
Kazmi et al.

(10) Patent No.: US 9,020,495 B2
(45) Date of Patent: Apr. 28, 2015

(54) METHOD AND ARRANGEMENT IN A COMMUNICATION SYSTEM

(75) Inventors: Muhammad Kazmi, Bromma (SE); Martin Israelsson, Spånga (SE); Dirk Gerstenberger, Stockholm (SE); Torbjörn Wigren, Uppsala (SE); Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 239 days.

(21) Appl. No.: 12/996,953

(22) PCT Filed: Jun. 24, 2008

(86) PCT No.: PCT/SE2008/050752
§ 371 (c)(1),
(2), (4) Date: Dec. 8, 2010

(87) PCT Pub. No.: WO2009/157823
PCT Pub. Date: Dec. 30, 2009

(65) Prior Publication Data
US 2011/0117942 A1    May 19, 2011

(51) Int. Cl.
*H04W 56/00* (2009.01)
*H04W 92/10* (2009.01)

(52) U.S. Cl.
CPC .......... *H04W 56/0065* (2013.01); *H04W 92/10* (2013.01)

(58) Field of Classification Search
USPC .......... 455/424, 456.5, 456.6, 115.2
See application file for complete search history.

(56) References Cited

U.S. PATENT DOCUMENTS

| | | | |
|---|---|---|---|
| 6,901,264 B2 * | 5/2005 | Myr | 455/456.5 |
| 2002/0132625 A1 | 9/2002 | Ogino et al. | |
| 2004/0248568 A1 * | 12/2004 | Lucidarme | 455/423 |

(Continued)

FOREIGN PATENT DOCUMENTS

| | | |
|---|---|---|
| EP | 1 233 280 A2 | 8/2002 |
| GB | 2 359 960 A | 9/2001 |

(Continued)

OTHER PUBLICATIONS

International Search Report, PCT International Application No. PCT/SE2008/050752, Mar. 23, 2009.

(Continued)

*Primary Examiner* — Wen Huang
(74) *Attorney, Agent, or Firm* — Myers Bigel Sibley & Sajovec, PA

(57) ABSTRACT

Method and arrangement in a base station, a user equipment and a positioning node, for sending, and obtaining, respectively, a value of a propagation delay of a signal. The signal is sent to the base station from a user equipment. The base station and the user equipment are comprised within a wireless communication system. Also, the base station and the user equipment are adapted to exchange wireless signals. The method is characterized by the step of receiving a signal sent from the user equipment. The method is further characterized by the step of measuring the value of the signal propagation delay of the received signal. Still further, the method is characterized by the step of sending the measured value to the equipment and/or to a positioning node comprised within the wireless communication system.

15 Claims, 11 Drawing Sheets

(56) References Cited

U.S. PATENT DOCUMENTS

| | | | |
|---|---|---|---|
| 2004/0258012 A1* | 12/2004 | Ishii | 370/328 |
| 2005/0058023 A1* | 3/2005 | Bakar et al. | 367/130 |
| 2006/0246905 A1* | 11/2006 | Sakuma et al. | 455/438 |
| 2007/0147337 A1 | 6/2007 | Bosch et al. | |
| 2009/0280749 A1* | 11/2009 | Tanno et al. | 455/67.13 |
| 2010/0113054 A1* | 5/2010 | Iwamura et al. | 455/452.1 |

FOREIGN PATENT DOCUMENTS

| | | |
|---|---|---|
| JP | 11-178038 | 7/1999 |
| WO | WO 02/059638 A2 | 8/2002 |

OTHER PUBLICATIONS

3GPP, Technical Specification: "$3^{rd}$ Generation Partnership Project; Technical Specification Group Radio Access Network; Physical Layer—Measurements (FDD) (Release 8)", 3GPP TS 25.215, V8.0.0, Mar. 2008, 20 pp.

3GPP, Technical Specification: "$3^{rd}$ Generation Partnership Project; Technical Specification Group Radio Access Network; Physical Layer—Measurements (TDD) (Release 8)", 3GPP TS 25,225, V8.0.0, Mar. 2008, 28 pp.

"Evaluation of the inclusion of Pattern Matching Technology in the UTRAN", TSG-RAN #38 Meeting, Cancun, Mexico, Nov. 26-30, 2007, RP-070926, 3 pp.

* cited by examiner

METHOD AND ARRANGEMENT IN A COMMUNICATION SYSTEM

CROSS REFERENCE TO RELATED APPLICATION

This application is a 35 U.S.C. §371 national stage application of PCT International Application No. PCT/SE2008/050752, filed on 24 Jun. 2008, the disclosure and content of which is incorporated by reference herein in its entirety. The above-referenced PCT International Application was published in the English language as International Publication No. WO 2009/157823 A1 on 30 Dec. 2009.

TECHNICAL FIELD

The present invention relates to a method and an arrangement in a base station, a method and an arrangement in a user equipment and/or to a method and an arrangement in a positioning node. More particularly the present invention relates to a mechanism for obtaining a signal propagation delay value.

BACKGROUND

Currently, standardized and commercially deployed radio access technologies are proliferated. Such radio access technologies include the Global System for Mobile communications (GSM), Enhanced Data Rates for GSM Evolution (EDGE), General Packet Radio System (GPRS), Wide-band Code Division Multiple Access (WCDMA), Long Term Evolution (LTE) systems, Wireless Local Area Networks (WLAN), CDMA 2000 and others.

Positioning in wireless communication systems comprising these or other technologies can be performed in many different ways. A typical approach is that a request for positioning is provided. If the positioning information is not already available, some kind of measurement may be performed, and positioning data may be reported to a node responsible for the actual positioning.

Fingerprinting positioning algorithms operate by creating a radio fingerprint for each point of a fine coordinate grid that covers the Radio Access Network. The fingerprint may e.g. comprise the cell IDs that are detected by the terminal, in each grid point, or quantized path loss or signal strength measurements, with respect to multiple radio base stations, performed by the terminal, in each grid point.

Whenever a position request arrives, a radio fingerprint is firstly computed, based on various parameters which need to be measured. Thereafter the corresponding grid point is looked up and reported. This requires that the point is unique. A major problem with this approach is that extensive surveying needs to be performed when the fingerprinting database is created. Extra parameter measurements and extra signalling in general has to be performed.

It is thus a problem with existing positioning methods, to generate radio fingerprints that are unique without spending too much radio resources on measurements and signalling. Additional parameter measurements and extra signalling in general have an influence on the overall system load and thus decrease the capacity.

It is thus a problem with existing positioning methods to generate radio fingerprints that are unique without spending too much radio resources on surveying.

SUMMARY

It is therefore an object of the present invention to provide an improved measurement mechanism for a communication system.

According to a first aspect the object is achieved by a method, in a base station, for sending a value of a propagation delay of a signal. The signal is sent to the base station from a user equipment. The user equipment is associated with a location point. The base station and the user equipment are comprised within a wireless communication system. Also, the base station and the user equipment are adapted to exchange wireless signals. When the base station has received a signal from the user equipment, the value of the signal propagation delay of the received signal is measured. The measured value is then sent to the user equipment and/or to a position node comprised within the wireless communication system.

According to a second aspect the object is also achieved by an arrangement in a base station. The arrangement is configured to signal a value of a propagation delay of a signal. The signal is sent to the base station from a user equipment. The user equipment is associated with a location point. The base station and the user equipment are comprised within a wireless communication system. Also, the base station and the user equipment are adapted to exchange wireless signals. The arrangement comprises a receiving unit, a measurement unit and a sending unit. The receiving unit is adapted to receive a signal and the measurement unit is adapted to measure a value of the signal propagation delay of the received signal. The measured value is sent to the user equipment and/or to a positioning node comprised within the wireless communication system by the accordingly adapted sending unit.

According to a third aspect the object is achieved by a method in a user equipment, for obtaining a value of a propagation delay of a signal. The signal is sent to a base station. The user equipment is associated with a location point. Further, the user equipment and the base station are comprised within a wireless communication system. The user equipment and the base station are adapted to exchange wireless signals. The user equipment transmits a signal to the base station and receives a value of the signal propagation delay of the sent signal.

According to a fourth aspect the object is also achieved by an arrangement in a user equipment. The arrangement is configured to obtain a value of a propagation delay of a signal transmitted to a base station. The user equipment is associated with a location point. The user equipment and the base station are comprised within a wireless communication system. The user equipment and the base station are adapted to exchange wireless signals. The arrangement comprises a transmitting unit and a receiving unit. The transmitting unit is adapted to transmit a signal to the base station and the receiving unit is adapted to receive a value of the signal propagation delay of the transmitted signal.

According to a fifth aspect the object is achieved by a method, in a positioning node, for obtaining a value of a propagation delay of a signal. The signal is sent from a user equipment to a base station. The user equipment is associated with a location point. The user equipment, the base station and the positioning node are comprised within a wireless communication system. Also, the user equipment, the base station and the positioning node are adapted to exchange wireless signals. A value of the signal propagation delay of the transmitted signal is received from the base station.

According to a sixth aspect the object is also achieved by an arrangement in a positioning node. The arrangement is configured to obtain a value of a propagation delay of a signal. The signal is sent from a user equipment to a base station. The user equipment is associated with a location point. The user equipment, the base station and the positioning node are comprised within a wireless communication system. Also, the user equipment, the base station and the positioning node are adapted to exchange wireless signals. The arrangement is characterised by a receiving unit. The receiving unit is adapted to receive a value of the signal propagation delay of the transmitted signal.

Thanks to the measurement of the signal propagation time according to the present methods, measured with respect to the location point of the user equipment, and the sending of the made measurement according to any of the present solution, an appropriate and unique radio fingerprint may be generated with reduced overhead signalling involved. Thereby an improved measurement mechanism in a wireless communication system is provided.

An advantage with the present solution is that they enable user equipment based fingerprinting positioning for determining the position of a user equipment with better accuracy.

A further advantage with the present solution is that they allow the reporting of one way propagation delay to the user equipment as well as to the positioning node, with reduced signalling overhead.

Yet an advantage with the present solution is that they enable network based fingerprinting positioning for determining the position of the user equipment with better accuracy.

BRIEF DESCRIPTION OF THE DRAWINGS

The present invention will now be described more in detail in relation to the enclosed drawings, in which.

DETAILED DESCRIPTION

The invention is defined as a method and an arrangement in a base station, a method and an arrangement in a user equipment and as a method and an arrangement in a positioning node, which may be put into practice in the embodiments described below. This invention may, however, be embodied in many different forms and should not be considered as limited to the embodiments set forth herein; rather, these embodiments are provided so that this disclosure will be thorough and complete, and will fully convey the scope of the invention to those skilled in the art.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1:
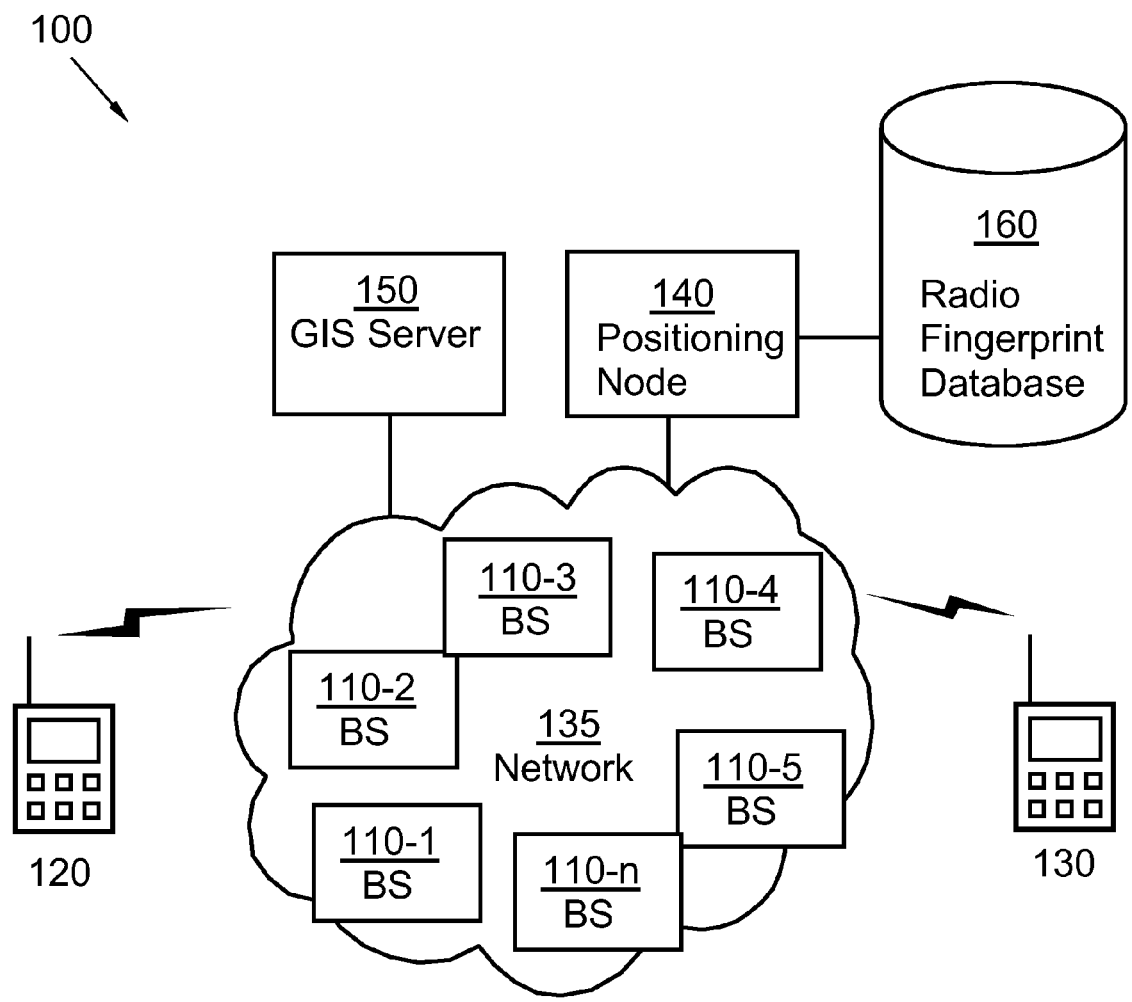
FIG. 1 is a schematic block diagram illustrating a wireless communication system according to some embodiments.

FIG. 1 is a schematic block diagram illustrating an exemplary wireless communication system 100, according to some embodiments. The wireless communication system 100 comprises one or multiple first nodes 110, one or multiple second nodes 120, 130 and a network 135. The wireless communication system 100 may optionally also comprise a positioning node 140 and a Geographic Information System (GIS) server 150 connected to the network 135.

It will be appreciated that the number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other components in FIG. 1.

The first node 110 may also be referred to as e.g. a base station, an access point, a Node B, an evolved Node B (eNode B) and/or a base transceiver station, Access Point Base Station, base station router, etc depending e.g. of the radio access technology and terminology used. In the rest of the description, the term "base station" will be used for the first node 110, in order to facilitate the comprehension of the present methods and arrangements. In FIG. 1, the first node 110 is represented by the base stations 110-1, 110-2, 110-3, 110-4, 110-5, . . . , 110-n.

The second node 120, 130 may be represented by e.g. a user equipment, a wireless communication terminal, a mobile cellular telephone, a Personal Communications Systems terminal, a Personal Digital Assistant (PDA), a laptop, a computer or any other kind of device capable of managing radio resources may communicate wirelessly with the base station 110 within the network 135. A Personal Communication System terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. One or more instances of the second node 120, 130 may be referred to as a "pervasive computing" device. In some implementations, the second node 120, 130 may be represented by a telephone that is connected to a Public Switched Telephone Network. However, in the rest of the description, the term "user equipment" will consistently be used for the second node 120, 130 in order to facilitate the comprehension of the present methods and arrangements. In FIG. 1, the second node 120, 130 is represented by a first user equipment 120 and a second user equipment 130. The first user equipment 120 may communicate with the other, second user equipment 130, or with other devices not shown, via the network 135 in the wireless communication system 100.

In one implementation, the first user equipment 120 may communicate with the second user equipment 130 via one or more other nodes that act as intermediate devices between the first user equipment 120 and the second user equipment 130. For example, as shown in FIG. 1, the base station 110-1, which may include wireless base station functionality, may reside as an intermediate component of the network 135 that may be used to facilitate end-to-end communication between the first and second user equipments 120 and 130 or between the user equipments 120, 130 and e.g. the positioning node 140 or the GIS server 150. Additional base stations 110-2 through 110-N may be comprised within the network 135.

The base stations 110-1 through 110-n may interface with the respective user equipments 120, 130, such that e.g. base station 110-1 may interface with the first user equipment 120, via respective wireless links and may perform, among other functions, Medium Access Control (MAC) and Radio Link Control (RLC).

The positioning node 140 may determine the location of user equipments 120, 130 in the wireless communication system 100. The positioning node 140 may be associated with a radio fingerprint database 160 that stores radio fingerprints derived e.g. from Evolved Universal Terrestrial Radio Access Network (E-UTRAN) and/or inter-Radio Access Technology (IRAT) measurement data. The database 160 may reside internal or external to positioning node 140 and may according to some embodiments be remotely connected to. The E-UTRAN and/or IRAT measurement data may be provided to the positioning node 140, in conjunction with precise geographic position data obtained at the same geographic location at which the E-UTRAN and/or IRAT measurements were performed, e.g.; GPS geographic position data. Also, the positioning node 140 may organize the precise geographic position data into clusters having a same or similar radio fingerprint. The positioning node 140 may further determine the cluster boundaries of each cluster and store the cluster boundary information, associated radio fingerprints, and precise geographic position data in the radio fingerprint database 160. The positioning node 140 may subsequently receive E-UTRAN and/or IRAT radio fingerprint measurement data from the first user equipment 120 and/or from the second user equipment 130 and may perform a lookup into the radio fingerprint database 160 to identify a radio fingerprint stored in the database 160 that matches the received E-UTRAN and/or IRAT radio fingerprint measurement data, and to retrieve a precise geographic position stored in the database 160 that corresponds to the matching radio fingerprint. Alternatively, the associated cluster boundary information is retrieved. The positioning node 140 may provide this geographic position to the user equipment 120, 130 that sent the radio fingerprint measurement data, or to other destinations, such as, for example, an emergency or police call centre.

The GIS server 150 may comprise one or more server entities that provide geographic mapping services, or related mapping services. The GIS server 150 may receive geographic position data concerning the user equipment 120, 130 from the positioning node 140, or from the user equipment 120, 130, and may map the received geographic position data to physical coordinates or a physical address, or perform other mapping related services with the geographic position data.

The network 135 may comprise one or more networks of any type, including a Local Area Network (LAN); a Wide Area Network (WAN); a Metropolitan Area Network (MAN); a telephone network, such as a Public Switched Telephone Network (PSTN) or a Public Land Mobile Network (PLMN); a satellite network; an intranet, the Internet; or a combination of these or other networks. The PLMN may further include a packet-switched sub-network, such as, for example, General Packet Radio Service (GPRS), Cellular Digital Packet Data (CDPD), or Mobile IP network.

The radio access technologies used for wireless communication within the wireless communication system 100 may comprise technologies such as e.g. Code division multiple access (CDMA), Wideband Code Division Multiple Access (WCDMA), CDMA 2000, High Speed Downlink Packet Data Access (HSDPA), High Data Rate (HDR) etc, just to mention a few examples.

As used herein, the wireless communication system 100 may refer to various radio access technologies without departing from the teachings of the present invention. These radio access technologies may include, for example, radio access technologies, such as Long Term Evolution (LTE), Enhanced Data rates for GSM Evolution (EDGE), General Packet Radio Service (GPRS), Global System for Mobile Telecommunications (GSM), High Speed Packet Data Access (HSPA), Universal Mobile Telecommunications System (UMTS) and/or Wireless Local Area Networks (WLAN), such as Wireless Fidelity (WiFi) and Worldwide Interoperability for Microwave Access (WiMAX), Bluetooth or according to any other wireless communication standard.

Figure 2:
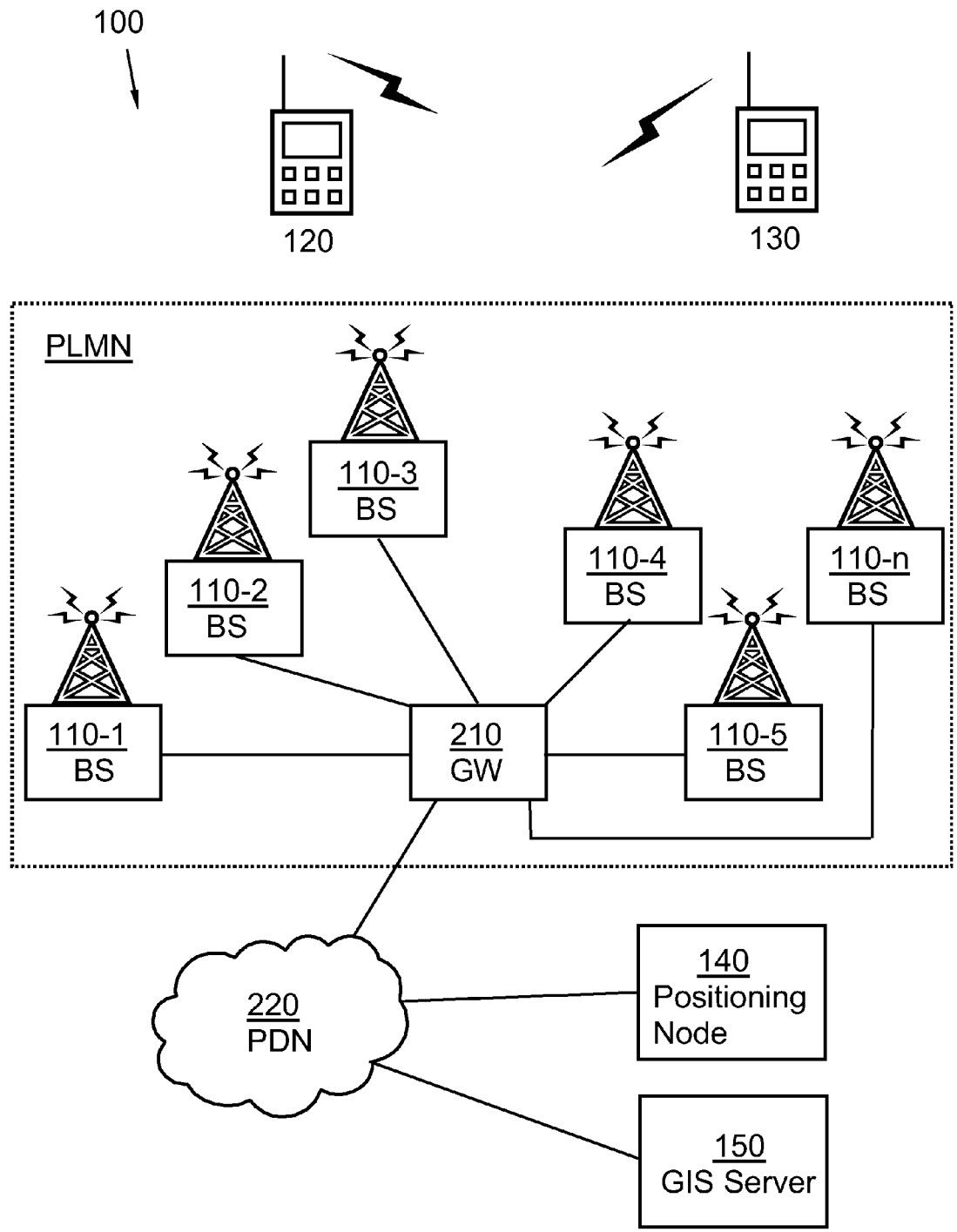
FIG. 2 is a schematic block diagram illustrating a wireless communication system according to some embodiments.

FIG. 2 illustrates an example of the wireless communication system 100 of FIG. 1, where the wireless communication system 100 comprises a PLMN. The PLMN may implement a Long Term Evolution (LTE) system architecture. As shown in FIG. 2, the user equipment 120, 130 may comprise cellular radiotelephones that are communicating with one another via the PLMN. The PLMN may comprise multiple base stations 110-1 through 110-N along with their associated antenna arrays and one or more gateways (GW) 210. The gateway 210 may further connect to a Packet Data Network (PDN) 220 of the system 100 which may further connect to the optional positioning node 140 and the optional GIS server 150. The PDN 220 may include any type of packet-switched network, such as, for example, the Internet.

The base stations 110-1 through 110-N may interface with respective user equipments 120, 130, e.g., base station 110-1 may interface with the user equipment 120 via respective wireless links and may perform, among other functions, Medium Access Control (MAC) and Radio Link Control (RLC). For example, the base station 110-1 may receive data transmissions from the first user equipment 120 and may forward those data transmissions on to the gateway 210. The gateway 210 may route data transmissions received from a respective base station 110 to another base station 110, or to the positioning node 140 or to the GIS server 150 via PDN 220. The gateway 210 may further route data transmissions received from positioning node 140 or GIS server 150 via PDN 220 to the respective base station 110-1 through 110-N associated with the destination user equipment 120, 130. Though positioning node 140 is shown in FIG. 2 as connected to the PLMN by way of PDN 220, in other implementations, the positioning node 140 may reside as a component of PLMN, e.g. connected internally to the PLMN without messaging having to traverse PDN 220.

Figure 3:
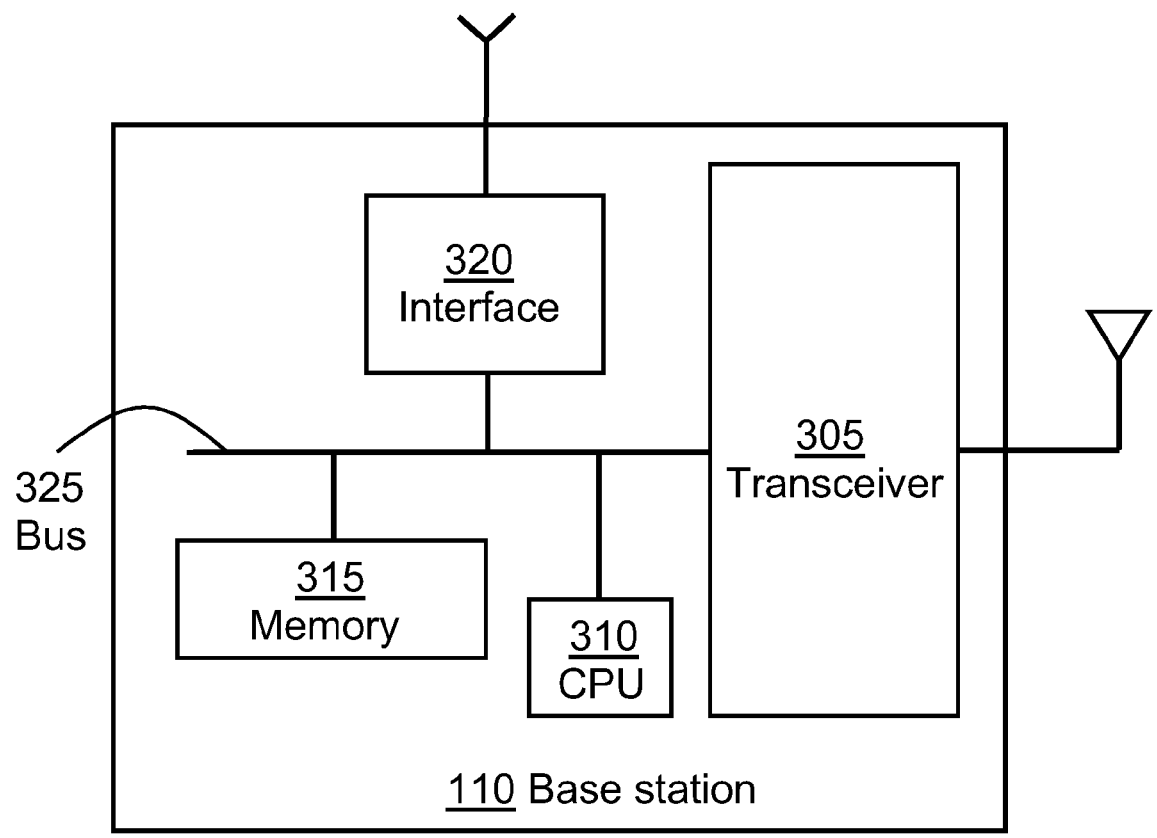
FIG. 3 is a schematic block diagram illustrating exemplary components of a base station according to some embodiments.

FIG. 3 illustrates one exemplary implementation of the base station 110-1. Base stations 110-2 through 110-N may be similarly configured. Also the optional positioning node 140 and the optional GIS server 150 may be similarly configured, however, the positioning node 140 and the GIS server 150 may not comprise the transceiver 305, according to some embodiments. The base station 110-1 may comprise e.g. a transceiver 305, a processing unit 310, a memory 315, an interface 320 and a bus 325. Further, the base station 110 may comprise an arrangement adapted to measure and obtain a value of a propagation delay of a signal sent to the base station 110 from a user equipment 120, as later will be explained in detail referring to FIG. 7.

The transceiver 305 may comprise transceiver circuitry for transmitting and/or receiving symbol sequences using radio frequency signals via one or more antennas. The one or more antennas may comprise a single antenna or an antenna array and may comprise directional and/or omni-directional antennas. The transceiver 305 may additionally comprise measurement circuitry that may perform e.g. one or more of various different Evolved Universal Terrestrial Radio Access Network (E-UTRAN) radio fingerprint measurements, such as, for example, measuring the Evolved Universal Terrestrial Radio Access (E-UTRA) Downlink Reference Signal transmit (DL RS) power at the base station 110-1.

The processing unit 310 may comprise a processor, microprocessor, or processing logic that may interpret and execute instructions. Further, the processing unit 310 may perform all data processing functions for the base station 110-1. The memory 315 may provide permanent, semi-permanent, or temporary working storage of data and instructions for use by the processing unit 310 in performing device processing functions. Also, the memory 315 may be a primary storage memory unit such as a processor register, a cache memory, a Random Access Memory (RAM) or similar. The memory unit 315 may however in some embodiments be a secondary memory unit such as a Read Only Memory (ROM), Electrically Erasable Programmable Read-Only Memory (EEPROM), programmable read-only memory (PROM) or erasable programmable read-only memory (EPROM) or a hard disk drive. The memory unit 315 may however in some embodiments be an off-line storage memory unit, a flash memory, a USB memory or a memory card. The memory unit 315 may further in some embodiments be a Network-attached storage (NAS) or in fact any other appropriate medium such as and/or optical recording medium and its corresponding drive, or any other disk, tape or media that can hold machine readable data.

The interface 320 may comprise circuitry for interfacing with a link that connects to the gateway 210. The bus 325 may interconnect the various components of the base station 110-1 to permit the components to communicate with one another.

The configuration of components of the base station 110-1 illustrated in FIG. 3 is for illustrative purposes only. Other configurations comprising more, fewer, or a different arrangement of components may be implemented.

Figure 4A:
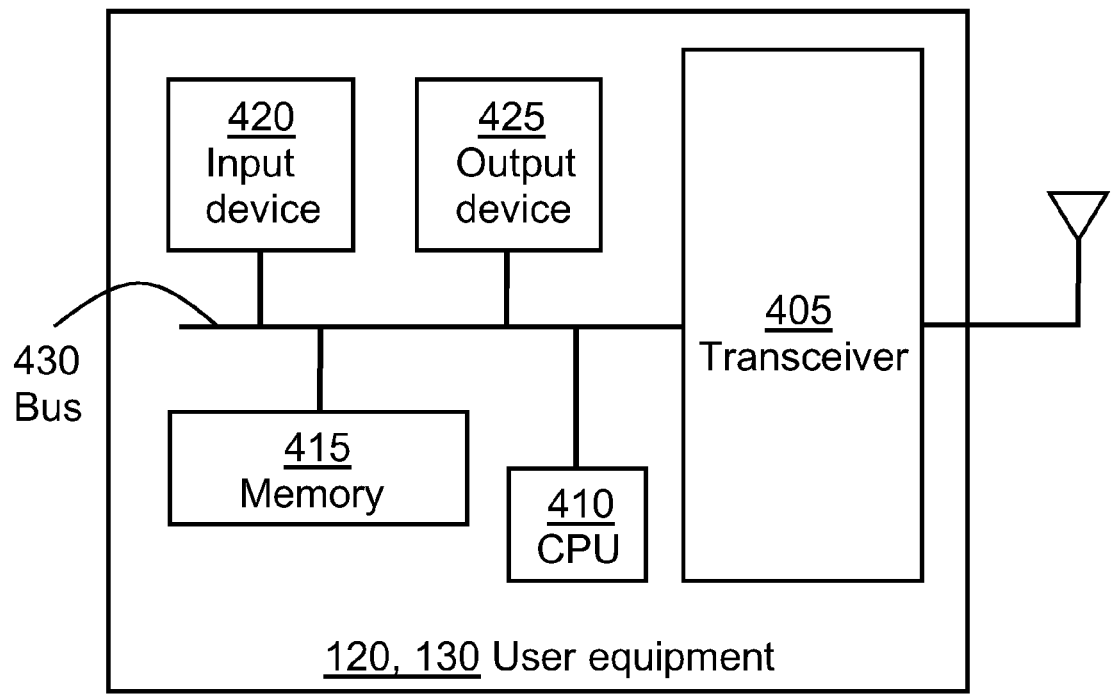
FIG. 4A is a schematic block diagram illustrating exemplary components of a user equipment according to some embodiments.

FIG. 4A illustrates the first user equipment 120 consistent with an exemplary embodiment. The second user equipment 130 may be similarly configured. The first user equipment 120 may comprise e.g. a transceiver 405, a processing unit 410, a memory 415, an input device 420, an output device 425, and a bus 430. Further, the first user equipment 120 may comprise an arrangement adapted to measure and obtain a value of a propagation delay of a signal sent to a base station 110 from the user equipment 120, as later will be explained in detail, referring to FIG. 9.

The transceiver 405 may comprise transceiver circuitry for transmitting and/or receiving symbol sequences using radio frequency signals via one or more antennas. The transceiver 405 may comprise, for example, a RAKE or a GRAKE receiver. Transceiver 405 may additionally comprise measurement circuitry that may perform one or more of various different E-UTRAN radio fingerprint measurements, based on, but not limited to, one or more of the following: a signal propagation measurement, signal propagation delay, a round trip time measurement, E-UTRA Reference Signal Received Power (RSRP); E-UTRA Carrier Received Signal Strength Indicator, (E-UTRA carrier RSSI); E-UTRA Reference Signal Received Quality (RSRQ); Wideband Code Division Multiple Access (WCDMA) UTRA Frequency Division Duplex (FDD) Common Pilot Channel (CPICH) Received Signal Code Power (RSCP); WCDMA UTRA FDD carrier RSSI; WCDMA UTRA FDD CPICH Ec/No, corresponding to a received energy per chip divided by a power density in a band; Global System for Mobile Communications (GSM) carrier RSSI; Time division duplex (TDD) mode UTRA TDD carrier RSSI; UTRA TDD Primary Common Control Physical Channel (P-CCPCH) RSCP; CDMA2000 1 times Radio Transmission Technology (1×RTT) pilot strength; and/or CDMA2000 High Rate Packet Data (HRPD) pilot strength.

The processing unit 410 may comprise a Central Processing Unit (CPU), processor, microprocessor, or processing logic that may interpret and execute instructions. The processing unit 410 may perform all data processing functions for inputting, outputting, and processing of data including data buffering and device control functions, such as call processing control, user interface control, or the like.

The memory 415 may provide permanent, semi-permanent, or temporary working storage of data and instructions for use by processing unit 410 in performing device processing functions. The memory 415 may comprise ROM, RAM, large-capacity storage devices, such as a magnetic and/or optical recording medium and its corresponding drive, and/or other types of memory devices. The input device 420 may comprise mechanisms for entry of data into the user equipment 120, 130. The key pad may permit manual user entry of data into the user equipment 120, 130. The microphone may comprise mechanisms for converting auditory input into electrical signals. The display unit may comprise a screen display that may provide a user interface, e.g., a graphical user interface that can be used by a user for selecting device functions. The screen display of the display unit may comprise any type of visual display, such as, for example, a Liquid Crystal Display (LCD), a plasma screen display, a Light-Emitting Diode (LED) display, a Cathode Ray Tube (CRT) display, an Organic Light-Emitting Diode (OLED) display, etc.

The output device 425 may comprise mechanisms for outputting data in audio, video and/or hard copy format. For example, the output device 425 may comprise a speaker that comprises mechanisms for converting electrical signals into auditory output. The output device 425 may further comprise a display unit that displays output data to the user. For example, the display unit may provide a graphical user interface that displays output data to the user. The bus 430 may interconnect the various components of the user equipment 120 to permit the components to communicate with one another.

The configuration of components of the user equipment 120 illustrated in FIG. 4A is for illustrative purposes only. Other configurations comprising more, fewer, or a different arrangement of components may be implemented. For example, in some implementations, the user equipment 120, 130 may comprise a GPS position measuring device, or alternatively be connected to an attached GPS position measuring device.

Figure 4B:
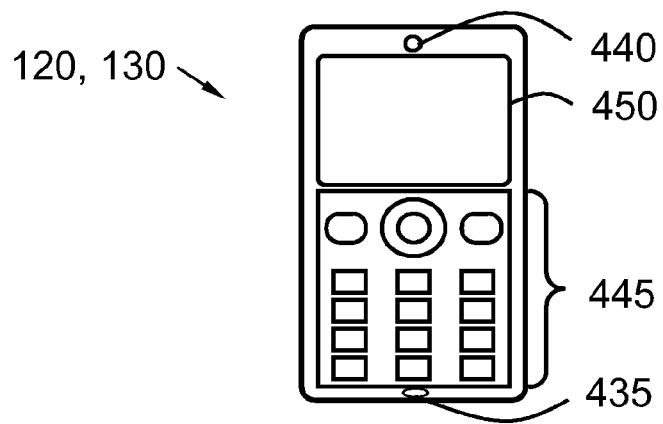
FIG. 4B is a schematic block diagram illustrating a user equipment according to some embodiments where the user equipment is embodied as a cellular telephone.

FIG. 4B illustrates an exemplary implementation of the user equipment 120, 130 in which the user equipment 120, 130 comprises a cellular radiotelephone. As shown in FIG. 4B, the user equipment 120, 130 may comprise a microphone 435, e.g., of input device 420 for entering audio information into the user equipment 120, a speaker 440, e.g., of output device 425 for providing an audio output from the radiotelephone, a keypad 445, e.g., of input device 420 for manual entry of data or selection of telephone functions, and a display 450, e.g., of input device 420 or output device 425 that may visually display data to the user and/or which may provide a user interface that the user may use to enter data or to select telephone functions, in conjunction with the keypad 445.

Figure 5:
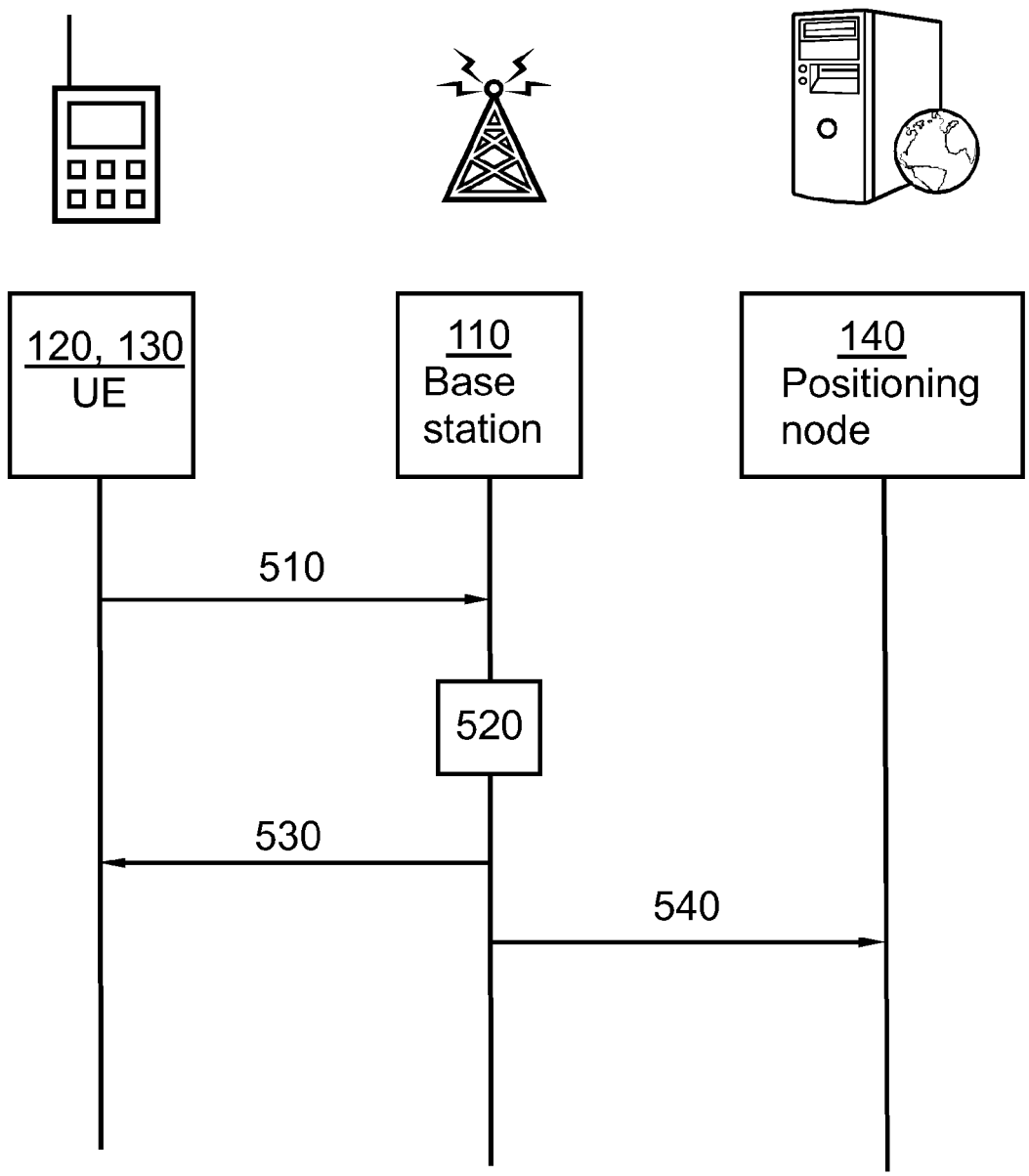
FIG. 5 is a combined signalling and flowchart illustrating radio signal transmission according to some embodiments.

FIG. 5 is a combined signalling and flowchart that depicts the transmission of a signal 510 from the user equipment 120, 130 to the base station 110 in a cell of the network 135. The user equipment 120, 130 may, at a certain location point in cell, transmit the signal 510 to be received by the base station 110, which signal 510 is used for estimating the signal propagation time for a signal 510 sent from the user equipment 120, 130 to the base station 110.

The one way propagation delay of the signal 520 sent between the user equipment 120, 130 and the base station 110 may be measured at the base station 110 in a measurement 520. The same propagation delay may be applied to both uplink and downlink.

According to some embodiments, e.g. in UTRAN systems, both in WCDMA and UTRA TDD, the one way propagation delay may be defined in terms of PRACH propagation delay. Thus a one-way propagation delay may be measured at the base station 110 during the random access process. An objective of this measurement 520 in WCDMA may be to adjust the receiver window for path searching. This may be particularly useful in cells with extended range since by the virtue of this measurement the base station 110 may use a narrow searcher by placing the window in accordance with the time of arrival of paths.

According to some other embodiments, e.g. in E-UTRAN, one way propagation delay may be measured 520 at the base station 110 when the user equipment 120, 130 transmits signals over a Physical Random Access CHannel, PRACH or a Physical Uplink Control CHannel such as e.g. PUCCH in E-UTRAN, for requesting scheduling grant as will be further explained below.

The user equipment 120, 130 may according to some embodiments transmit PRACH during initial access in order to move from idle mode to connected mode. In addition the user equipment 120, 130 also may transmit PRACH in connected mode in the target cell to acquire synchronization during the handover. In either case the PRACH transmission occurs at a fixed time in relation to the downlink frame timing of the cell. Due to this fixed time relation any additional delay on top of the fixed time plus timing inaccuracy is accounted for the one way propagation delay; the base station 110 may conveniently measure 520 this while receiving the PRACH. The frame timing of the target cell may be acquired by the user equipment 120, 130 during the cell search procedure.

It may also be noted that in E-UTRAN there are only two radio resource control (RRC) states: idle and connected. After some inactivity the user equipment 120, 130 in connected mode will go into idle mode. But it will again re-enter into the connected mode via normal random access transmission. This means at every transition from idle to connected mode the network 135 may measure the one way propagation delay, according to some embodiments.

In E-UTRAN, which is a packet oriented system, the user equipment 120, 130 may not be continuously transmitting or receiving any data or control signalling in connected mode. Also, the user equipment 120, 130 may be operating in discontinuous (DRX) mode also in connected mode. Mentioned as an illustrating example only, a DRX cycle of 1.28 second when receiving packet data may be used. Furthermore in E-UTRAN the network 135 assigns the radio resources to the user equipment 120, 130 for uplink transmission on demand basis. To enable fast access to the radio resource for uplink transmission the user equipment 120, 130 is allowed to request scheduling grants any time. For instance the user equipment 120, 130 may request grants on the onset of data arrival in its buffer. The user equipment 120, 130 may send scheduling requests on uplink control channel i.e. physical uplink control channel (PUCCH). The transmission on PUCCH may take place at a fixed time in relation to the downlink frame timing of a cell. Therefore like in case of PRACH transmission, the base station 110 may also measure 520 one way propagation delay when the user equipment 120, 130 transmits PUCCH, according to some embodiments. During this unilateral PUCCH transmission the base station 110 may not estimate 2-way propagation delay, which on the other hand is possible to measure when normal uplink and downlink transmission resume.

The network 135 may adjust the timing of the uplink channels including PUCCH by signalling the timing advance to the user equipment 120, 130. But due to the packet mode and DRX operation the PUCCH may be transmitted after long inactivity. In the mean time the one way propagation delay may also change. Therefore any offset in the reception time of PUCCH may be accounted for any additional propagation delay in addition to the net timing advance, or net adjusted time.

Thus in summary, the packet oriented nature of E-UTRAN does not allow continuous uplink and downlink transmission all the time. This in turn prevents the network 135 from continuously measuring 520 the one way propagation delay. But on the other hand relatively more frequent PRACH and unilateral uplink control channel such as e.g. PUCCH transmissions would allow the network 135 to more often measure 520 the one way propagation delay.

After the performance of the signal propagation time measurement 520 in the base station 110, the base station 110 transmits 530 the value of the measured signal propagation time to the user equipment 120, 130, according to some embodiments.

According to some embodiments, the signal propagation time measurement is signalled to the user equipment 120, 130 via the Radio Resource Control (RRC) protocol i.e. layer 3 in a WCDMA system. Alternatively it may be signalled via Medium Access Control (MAC) i.e. layer 2. Further, it may be possible to transmit this measurement in an application which is mapped on the user plane.

According to some embodiments, the measured signal propagation time may be reported 540 to the positioning node 140.

Figure 6:
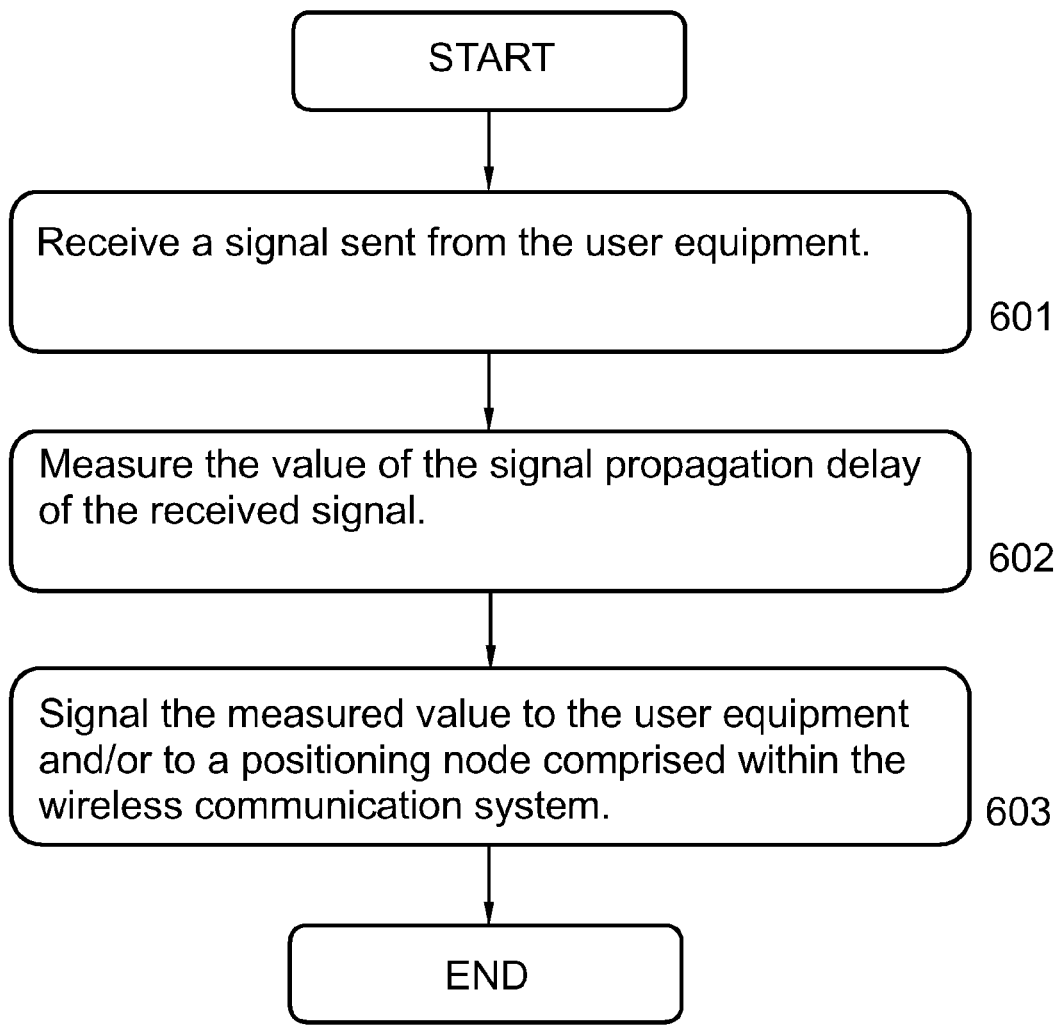
FIG. 6 is a schematic flow chart illustrating an embodiment of the present method in a base station according to some embodiments.

FIG. 6 is a flow chart illustrating a method in the base station 110, for signalling a value of a propagation delay of a signal sent to the base station 110 from a user equipment 120. The user equipment 120 is associated with a location point. The base station 110 and the user equipment 120 are comprised within a wireless communication system 100. Further, the base station 110 and the user equipment 120 are adapted to exchange wireless signals.

To appropriately signalling the value of the propagation delay, the method may comprise a number of steps 601-603. It is however to be noted that some parts of the described method steps are optional and only comprised within some embodiments. Further, it is to be noted that the method steps 601-603 may be performed in any arbitrary chronological order and that some of them, e.g. step 602 and step 603, or even all steps may be performed simultaneously or in an altered, arbitrarily rearranged, decomposed or even completely reversed chronological order. The method comprises the following steps:

Step 601
A signal sent from the user equipment 120 is received.
Step 602
The value of the signal propagation delay of the received signal is measured. The measurement is performed in the base station 110. In order to measure the signal propagation delay of the received signal, the point of time of sending the signal, as well as the point of time for receiving the signal may be obtained.
Step 603
The measured value is sent to the user equipment 120 and/or to a positioning node 140 comprised within the wireless communication system 100.

The value of the measured signal propagation delay may be sent using one of the protocols: radio resource control protocol or medium access protocol.

The reporting are the means which may allow reduction of sending overheads but at the same time ensure that measurements are available when needed. They therefore aims at setting optimum delivery of propagation delay to the user equipment 120 and/or the positioning node 140. The sending according to the present method may be based on any of the three principles periodical reporting, event triggered reporting or event triggered periodical reporting. These three report method principles will in the following be further explained in detail.

Periodical Reporting

The propagation delay may be reported at regular interval when using periodical reporting. Typically the base station 110 may measure the one way propagation delay when the user equipment 120 transmits e.g. PRACH or other channels in the uplink, according to some embodiments. But the base station 110 may also estimate the propagation delay during closed loop operation.

The determination of the reporting rate in periodical reporting may be based on various parameters such as e.g. the cell size, the change in position of the user equipment 120 or the speed of the user equipment 120. The sending of the measured signal propagation delay may thus, according to some embodiments, be performed periodically. The periodicity of the sending may be determined based on a property out of the group: magnitude of a position change of the user equipment 120, speed of the user equipment 120 or the periodicity of a Discontinuous Reception cycle, DRX.

According to some embodiments, the network 135 may set some fixed periodic sending rate, for instance depending upon the cell size. Thus in large cells the signalling may be done more frequently assuming the user equipment 120 will move faster and vice versa.

However, according to some embodiments, the reporting rate may be set as a function of change in position. According to these embodiments, the network 135 may adjust or modify the reporting rate depending upon the change in the position of the user equipment 120 over the last monitoring duration. For instance if the user equipment 120 has not changed position significantly over time then the sending rate, i.e. signal the propagation delay, may be reduced. The network 135 may also perform double check by comparing the previously sent and currently measured propagation delay samples. If the position of the user equipment 120 has not changed significantly, then both measurement samples would be in the same range. However the opposite is not necessarily true. Although the position of the user equipment 120 might have changed over time, the propagation delay might still be in the same range.

This approach may reduce signalling overheads while the user equipment 120 positioning may still be tracked with required accuracy.

The reporting rate may, according to some embodiments be a function of the speed of the user equipment 120. The network 135 may according to these embodiments adjust or modify the reporting rate depending upon the speed of the user equipment 120. It may be assumed that the sending concerning the propagation delay may be performed more frequently if the speed of the user equipment 120 is high, as this implicates a change in geographical position.

According to some embodiments, the reporting rate may be a function of the DRX cycle. When DRX is in use the network 135 may at most signal the propagation delay to the user equipment 120 once every DRX. Therefore, in DRX mode, which may be employed also in connected mode, the network 135 may with certain advantage adjust the periodical reporting rate as a function of DRX cycle.

Regardless of whether the DRX is in use or not, the base station 110 may perform one way propagation delay measurement whenever uplink transmission occurs, according to some embodiments. Note that uplink transmission can take place independent of the DRX cycle. Therefore the network 135 may signal the propagation delay to the positioning node 140 with any rate irrespective of the DRX cycle in operation.

Event Triggered Fashion

However, according to some embodiments, the sending may be performed in an event triggered fashion. Thus, the propagation delay may be signalled in response to an occurring event. The event may be e.g. after the measurement of the propagation delay or when the position change of the user equipment 120 exceeds a certain threshold value.

The event may occur in the base station 110, which performs the one way propagation delay measurement. In UTRAN the RNC may configure such an event at the base station 110, i.e. Node B for transmitting measurement, at the user equipment 120 and at the positioning node 140 for receiving measurement according to the event. In E-UTRAN this may be an internal event at the eNode B 110, which in turn may also configure the user equipment 120 and the positioning node 140 for receiving the measurement according to the event.

According to some embodiments, the propagation delay may be signalled to the user equipment 120 and/or the positioning node 140 after the measurement of propagation delay. According to those embodiments, the propagation delay may be sent whenever the base station 110 performs propagation delay measurement, especially while receiving PRACH or other unilateral control channel in the uplink.

According to some embodiments, the propagation delay may be sent to the user equipment 120 and/or the positioning node 140 when the change in position of the user equipment 120 exceeds a threshold value. The network 135 may accordingly to these embodiments send the propagation delay if it is detected that the position of the user equipment 120 has changed beyond some threshold level. Similarly, if the position of the user equipment 120 has not changed over a predetermined time period, then the network 135 may not send any new value of the propagation delay. The network 135 may also perform double check by comparing the previously signalled propagation delay and currently measured propagation delay samples. If the user equipment 120 position has not changed significantly then both measurement samples may be expected to be found in the same range. However the opposite is not necessarily true. Thus, although the user equipment 120 position might have changed over time, the propagation delay may still be in the same range.

Event Triggered Periodical Reporting

According to some embodiments, the reporting of the propagation delay may be performed periodically after the occurrence of some event. The triggering event may be e.g. when the change in propagation delay exceeds a certain threshold value, when the change of position of the user equipment 120 exceeds a certain threshold value, when the user equipment 120 speed exceeds a certain threshold value etc.

According to some embodiments, the step of sending the value of the measured signal propagation delay may be performed periodically if a threshold limit value is exceeded. The sending may be performed in event triggered fashion if the threshold limit value is not exceeded.

The threshold limit value may, according to some embodiments, concern a second node parameter out of the group: signal propagation delay, magnitude of a position change of the user equipment 120 or speed of the user equipment 120.

According to some embodiments, the reporting of the propagation delay may be performed when the change in propagation delay exceeds a certain threshold limit value. If a significant change in the propagation delay measured over a pre-determined time period is detected, the network 135 may start to periodically report the signal propagation delay, according to some embodiments.

Thus, according to some embodiments, the network 135 may start periodical reporting of the measured propagation delay when the change of position of the user equipment 120 exceeds a certain threshold limit value. The threshold limit value may be predetermined and set e.g. by the network 135.

The network 135 may according to some embodiments, revert to the event reporting if the change in the user equipment 120 position falls below another threshold, over a pre-determined time.

According to some embodiments, the network 135 may start periodical reporting of the propagation delay if the user equipment 120 speed exceeds a certain threshold limit value over a pre-determined time. The network 135 may revert to the event reporting if the user equipment 120 speed falls below another threshold limit value over a pre-determined time.

The user equipment 120 speed may be determined in several ways. The speed of the user equipment 120 may e.g. be tracked at the base station 110 by measuring the Doppler frequency of the user equipment 120 under consideration.

The propagation delay may be reported in terms of number of chips in UTRAN and/or as a function of cyclic prefix in E-UTRAN. The normal and extended Control Plane (CP) lengths in E-UTRAN are in the order of 5 and 16 μs respectively. Since propagation delay may be very fine therefore in E-UTRAN, the reporting may still be done in terms of number of CP (N). However rules can be defined to derive the actual propagation delay ($D_p$). For instance:

$$D_p = 2^{k \times N}$$

Where N is an integer which may take any positive and negative value; k is a constant. Another possibility may be to report it in the scale of nano or micro second.

According to some embodiments, the report of the absolute value of the propagation delay may be followed by several different reports. The differential means the difference between the previous and current absolute propagation delays e.g. ΔN in case of E-UTRAN. One bit may be needed to indicate whether the reported quantity is absolute or differential.

The base station 110 may, according to some embodiments be represented by an evolved node B, eNode B, and the wireless communication system 100 may be represented by an Evolved Universal Terrestrial Radio Access Network, E-UTRAN.

However, according to some embodiments, the base station 110 may be represented by a node B and the wireless communication system 100 may be represented by a Universal Terrestrial Radio Access Network, UTRAN.

The user equipment 120 may according to some embodiments be represented by a mobile telephone.

Figure 7:
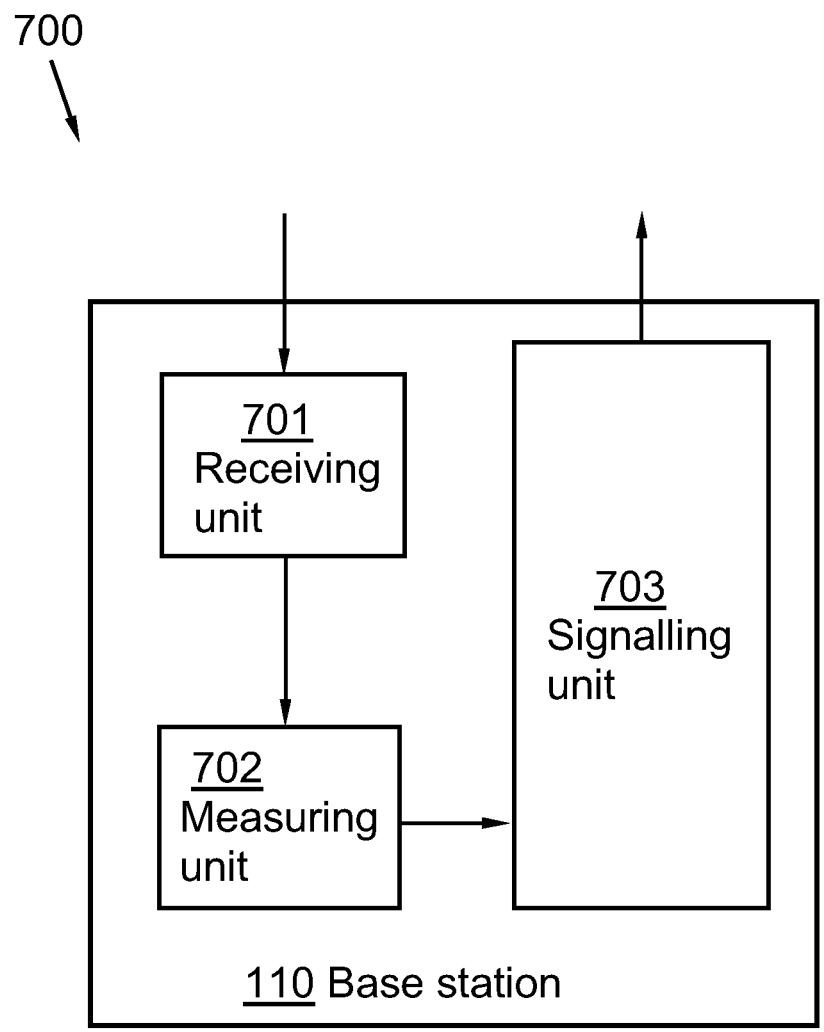
FIG. 7 is a schematic block diagram illustrating an arrangement in a base station according to some embodiments.

To perform the method steps above, the base station 110 comprises an arrangement 700, depicted in FIG. 7. The arrangement 700 is configured for sending a value of a propagation delay of a signal sent to the base station 110 from a user equipment 120. The user equipment 120 is associated with a location point. The base station 110 and the user equipment 120 are comprised within a wireless communication system 100. Also, the base station 110 and the user equipment 120 are adapted to exchange wireless signals.

The arrangement 700 comprises a receiving unit 701. The receiving unit 701 is adapted to receive a signal sent from the user equipment 120. Further, the arrangement 700 comprises a measurement unit 702. The measurement unit 702 is adapted to measure the value of the signal propagation delay of the received signal. Further yet, the arrangement 700 comprises a signalling unit 703. The signalling unit 703 is adapted to signal the measured value to the user equipment 120 and/or to a positioning node 140 comprised within the wireless communication system 100.

It is to be noted that any internal electronics of the base station 110 not completely necessary for performing the present method according to the method steps 601-603, such as e.g. some of the internal electronics of the base station 110 depicted in FIG. 3, has been omitted from FIG. 7, for clarity reasons.

The measurement unit 702, which is comprised within the arrangement 700 in a base station 110 may be a processing unit.

The sending unit 703 may according to some embodiments be configured to send the value of the measured signal propagation delay using any of the protocols radio resource control protocol or medium access protocol.

The sending unit 703 may according to some embodiments be configured to send the value of the measured signal propagation delay periodically. The periodicity may be determined based on a property out of the group: magnitude of a position change of the user equipment 120, speed of the user equipment 120 or the periodicity of a Discontinuous Reception cycle, DRX.

However, according to some embodiments, the sending unit 703 may be configured to signal the value of the measured signal propagation delay is performed in event triggered fashion. The triggering event may be e.g. a measurement of signal propagation delay, or when a position change of the user equipment 120 exceeding a certain threshold value, is detected.

According to some embodiments the sending unit 703 may be configured to signal the value of the measured signal propagation delay in an event triggered periodical fashion.

Further, according to some embodiments, the sending unit 703 may be configured to signal the value of the measured signal propagation delay periodically; if a threshold limit value is exceeded. Otherwise, if the threshold limit value is not exceeded, the sending unit 703 may be configured to send the value of the measured signal propagation delay in an event triggered fashion.

According to some embodiments, the threshold limit value concerns a second node parameter out of the group: signal propagation delay, magnitude of a position change of the user equipment 120 or speed of the user equipment 120.

It is to be noted that the described units 701-703 comprised within the arrangement 700 in a base station 110 are to be regarded as separate logical entities but not with necessity separate physical entities. Any, some or all of the units 701-703 may be comprised or co-arranged within the same physical unit. However, in order to facilitate the understanding of the functionality of the arrangement 700 in the base station 110, the comprised units 701-703 are illustrated as separate physical units in FIG. 7.

As an example of the latter, the receiving unit 701 and the sending unit 703 may according to some embodiments be comprised within one physical unit, a transceiver, which may comprise a transmitter circuit and a receiver circuit, which respectively transmits outgoing radio frequency signals to the user equipment 120 and receives incoming radio frequency signals from the user equipment 120 via an antenna. The antenna may be an embedded antenna, a retractable antenna or any antenna known to those having skill in the art without departing from the scope of the present invention. The radio frequency signals transmitted between the user equipment 120 and the base station 110 may comprise both traffic and control signals e.g., paging signals/messages for incoming calls, which may be used to establish and maintain a voice call communication with another party or to transmit and/or receive data, such as SMS, e-mail or MMS messages, with another remote user equipment 130.

Figure 8:
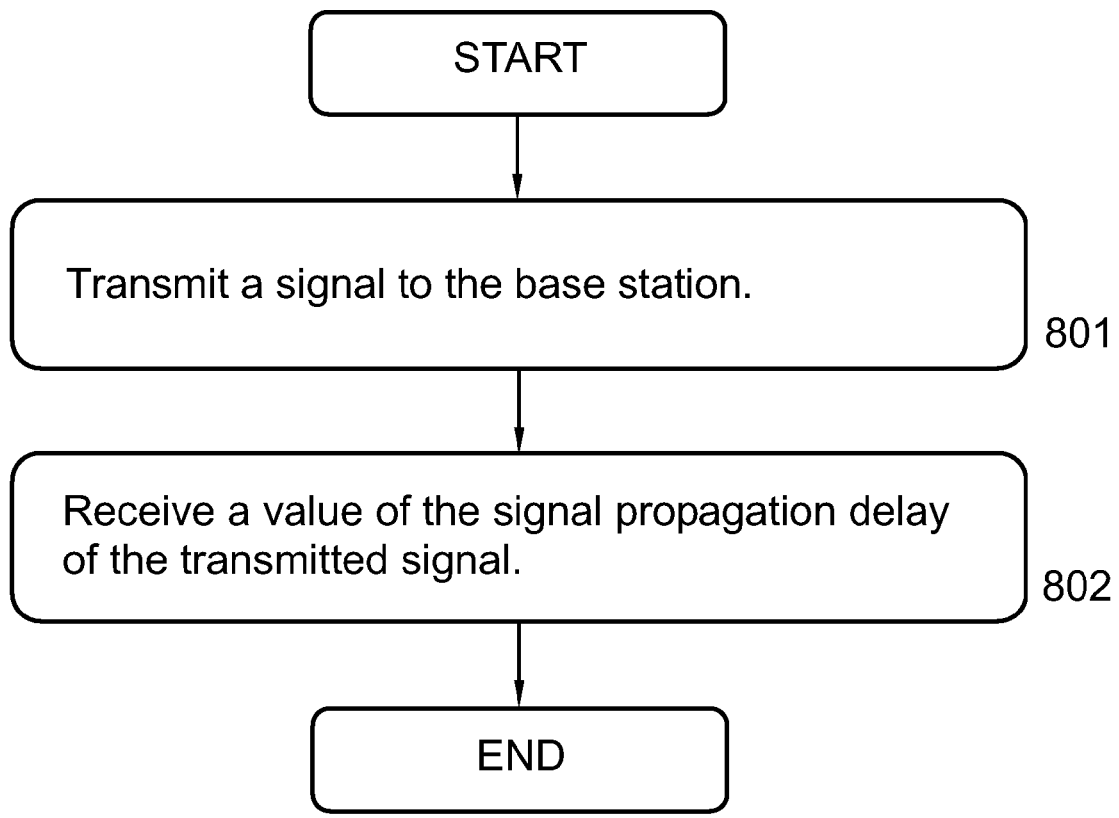
FIG. 8 is a schematic flow chart illustrating an embodiment of the present method in a user equipment according to some embodiments.

FIG. 8 is a flow chart illustrating a method in a user equipment 120, for obtaining a value of a propagation delay of a signal sent to a base station 110. The user equipment 120 may be e.g. a mobile telephone. The user equipment 120 is associated with a location point. The base station 110 may be e.g. a Node B or an e-Node B. The base station 110 and the user equipment 120 are comprised within a wireless communication system 100. The wireless communication system 100 may be e.g. UTRAN or EUTRAN. Further, the base station 110 and the user equipment 120 are adapted to exchange wireless signals.

To appropriately obtain the value of the propagation delay, the method may comprise a number of steps 801-802. It is however to be noted that some parts of the described method steps are optional and only comprised within some embodiments. Further, it is to be noted that the method steps 801-802 may be performed in any arbitrary chronological order and that step 801 and step 802, may be performed simultaneously or in an altered, arbitrarily rearranged, decomposed or even completely reversed chronological order. The method comprises the following steps:

Step 801

A signal is transmitted to the base station 110.

Step 802

The value of the signal propagation delay of the transmitted signal is received.

According to some embodiments, the step of receiving 802 the value of the signal propagation delay may be performed using one of the protocols: radio resource control protocol or medium access protocol.

Figure 9:
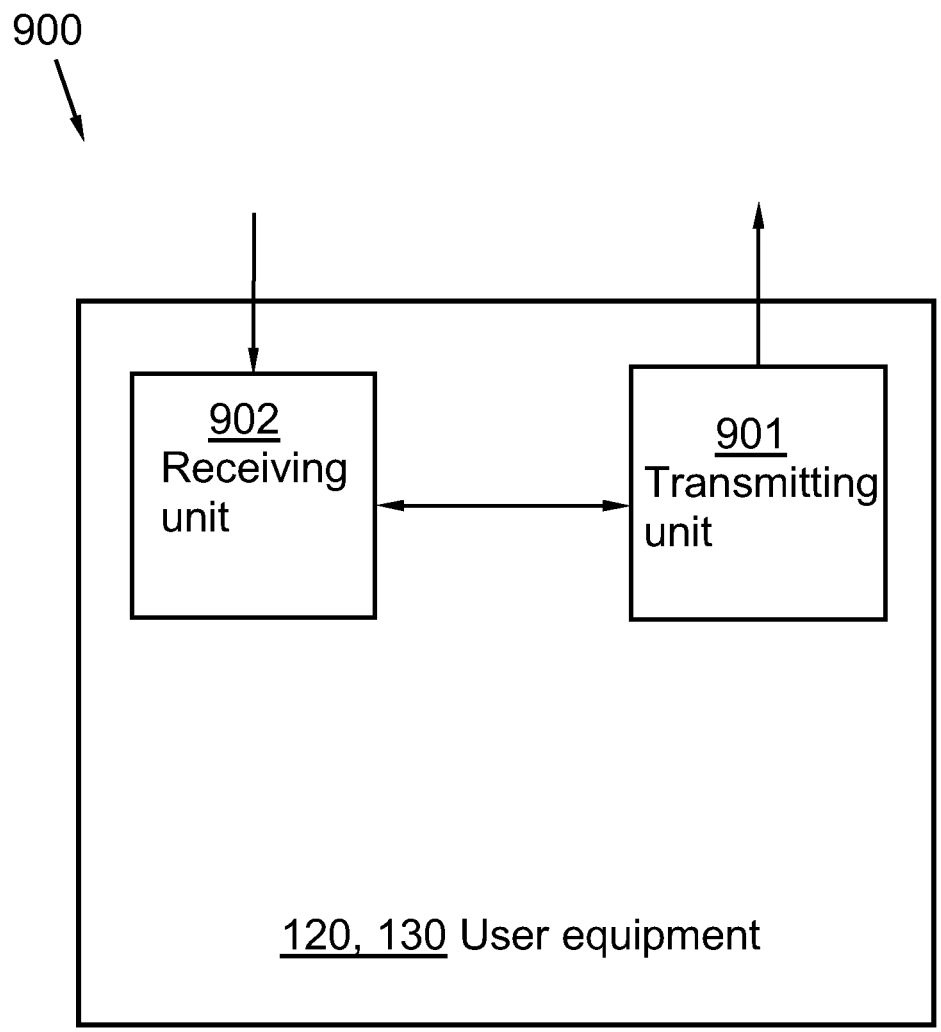
FIG. 9 is a schematic block diagram illustrating an arrangement in a user equipment according to some embodiments.

FIG. 9 schematically depicts an embodiment of an arrangement 900 in a user equipment 120. The arrangement 900 is configured to obtain a value of a propagation delay of a signal sent to a base station 110. The user equipment 120 is associated with a location point. The user equipment 120 and the base station 110 are comprised within a wireless communication system 100. Also, the base station 110 and the user equipment 120 are adapted to exchange wireless signals.

The arrangement 900 comprises a transmitting unit 901. The transmitting unit 901 is adapted to transmit a signal to the base station 110. Further, the arrangement 900 comprises a receiving unit 902. The receiving unit 902 is adapted to receive a value of the signal propagation delay of the transmitted signal.

It is to be noted that any internal electronics of the user equipment 120 not completely necessary for performing the present method according to the method steps 801-802, such as e.g. some of the internal electronics of the user equipment 120 depicted in FIG. 4, has been omitted from FIG. 9, for clarity reasons.

It is to be noted that the described units 901 and 902, comprised within the arrangement 900 in the user equipment 120 are to be regarded as separate logical entities but not with necessity separate physical entities. The transmitting unit 901 and the receiving unit 902 may be comprised or co-arranged within the same physical unit. As an example of the latter, the transmitting unit 901 and the receiving unit 902 may according to some embodiments be comprised within one physical unit, a transceiver, which may comprise a transmitter circuit and a receiver circuit, which respectively transmits outgoing radio frequency signals to the base station 110 and receives incoming radio frequency signals from the base station 110 via an antenna. The antenna may be an embedded antenna, a retractable antenna or any antenna known to those having skill in the art without departing from the scope of the present invention. The radio frequency signals transmitted between the user equipment 120 and the base station 110 may comprise both traffic and control signals e.g., paging signals/messages for incoming calls, which may be used to establish and maintain a voice call communication with another party or to transmit and/or receive data, such as SMS, e-mail or MMS messages, with a remote user equipment 130.

Figure 10:
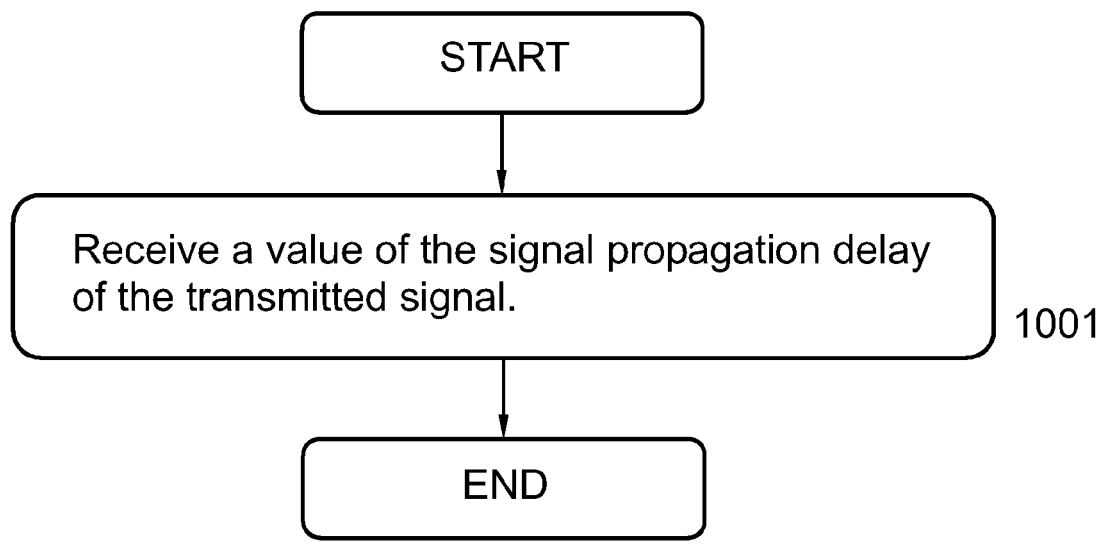
FIG. 10 is a schematic flow chart illustrating an embodiment of the present method in a positioning node according to some embodiments.

FIG. 10 is a flow chart illustrating a method in a positioning node 140, for obtaining a value of a propagation delay of a signal sent from a user equipment 120 to a base station 110. The user equipment 120 may be e.g. a mobile telephone. The base station 110 may be e.g. a Node B or an e-Node B. The user equipment 120 is associated with a location point. The base station 110, the user equipment 120 and the positioning node 140 are comprised within a wireless communication system 100. The wireless communication system 100 may be e.g. UTRAN or EUTRAN. Further, the base station 110, the user equipment 120 and the positioning node 140 are adapted to exchange wireless signals.

To appropriately obtain the value of the propagation delay, the method may comprise a method step 1001.

Step 1001

A value of the signal propagation delay of the signal transmitted between the user equipment 120 and the base station 110 is received from the base station 110.

According to some embodiments, the step of receiving 1001 the value of the signal propagation delay may be performed using one of the protocols: radio resource control protocol or medium access protocol.

Figure 11:
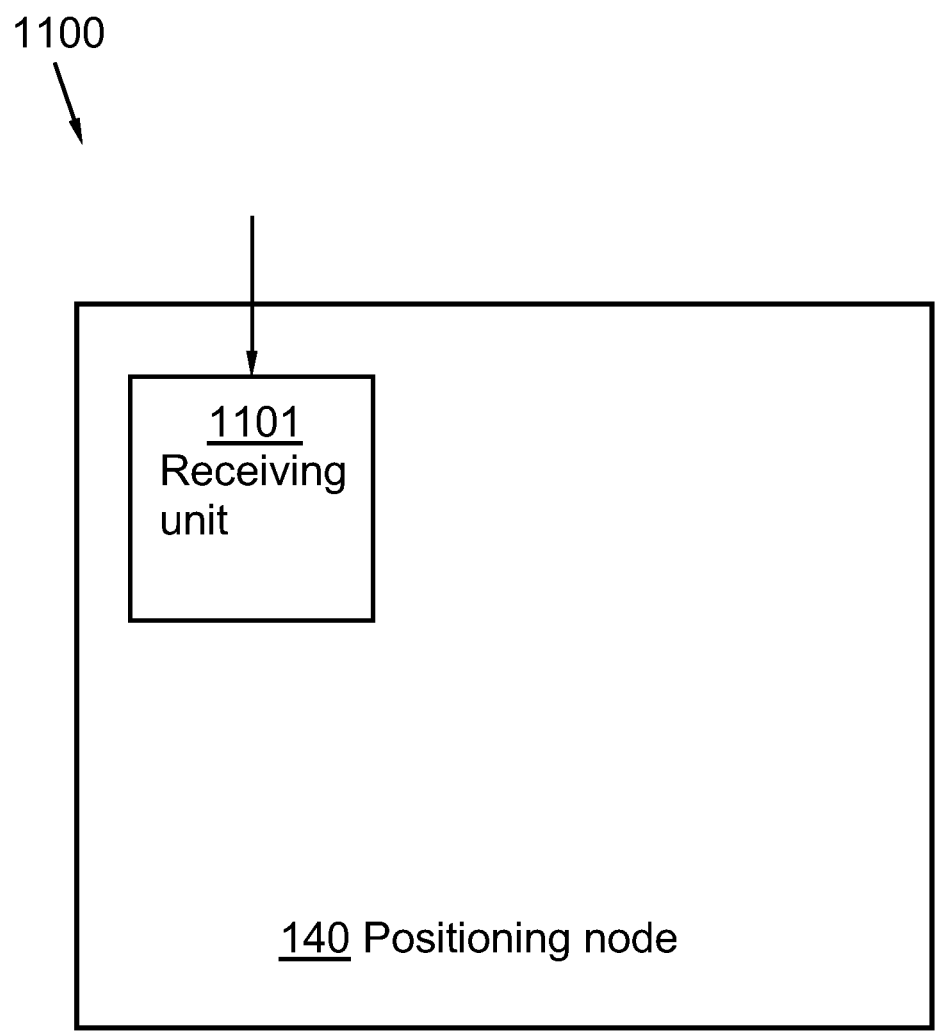
FIG. 11 is a schematic block diagram illustrating an arrangement in a positioning node according to some embodiments.

FIG. 11 schematically depicts an embodiment of an arrangement 1100 in a positioning node 140. The arrangement 1100 is configured to obtain a value of a propagation delay of a signal sent from a user equipment 120 to a base station 110. The user equipment 120 may be e.g. a mobile telephone. The base station 110 may be e.g. a Node B or an e-Node B. The user equipment 120 is associated with a location point. The base station 110, the user equipment 120 and the positioning node 140 are comprised within a wireless communication system 100. The wireless communication system 100 may be e.g. UTRAN or EUTRAN. Further, the base station 110, the user equipment 120 and the positioning node 140 are adapted to exchange wireless signals.

The arrangement 1100 comprises a receiving unit 1101. The receiving unit 1101 is adapted to receive a value of the signal propagation delay of the transmitted signal.

It is to be noted that any internal electronics of the positioning node 140 not completely necessary for performing the present method according to the method step 1001 has been omitted from FIG. 11, for clarity reasons.

Some Particular Embodiments

The present methods for sending and obtaining, respectively, a value of a propagation delay of a signal sent from the user equipment 120 to the base station 110 may be implemented through one or more processors in the base station 110, the user equipment 120 and/or the positioning node 140, together with computer program code for performing the functions of the present methods. The program code mentioned above may also be provided as a computer program product, for instance in the form of a data carrier carrying computer program code for performing the methods according to the respective method steps when being loaded into the processor unit. The data carrier may be e.g. a CD ROM disc, a memory stick, or any other appropriate medium such as a disk or tape that can hold machine readable data. The computer program code may furthermore be provided as pure program code on a server and downloaded to the base station 110 and/or the user equipment 120 and/or the position node 140 remotely.

Thus a computer readable medium encoded with a computer program for sending a value of a propagation delay of a signal sent from the user equipment 120 to the base station 110 may perform the method according to the method steps 601-603.

Thus also a computer readable medium encoded with a computer program for providing a value of a propagation delay of a signal sent from the user equipment 120 to the base station 110 may perform the method according to the method steps 801-802.

Thus also a computer readable medium encoded with a computer program for providing a value of a propagation delay of a signal sent from the user equipment 120 to the base station 110 may perform the method according to the method step 1001.

The invention claimed is:

1. A method in a base station, for sending a value of a propagation delay of a signal sent to the base station from a user equipment that is associated with a location point, the base station and the user equipment are comprised within a wireless communication system and are adapted to exchange wireless signals, the method comprising the steps of:
   receiving a signal sent from the user equipment, associated with the location point;
   measuring the value of the signal propagation delay of the received signal;
   determining magnitude of a position change of the user equipment and/or speed of the user equipment; and
   sending the measured value of the signal propagation delay from the base station to the user equipment and/or to a positioning node comprised within the wireless communication system, wherein the step of sending the measured value of the signal propagation delay from the base station to the user equipment and/or to the positioning node is performed at a periodicity which is determined based on the determined magnitude of the position change of the user equipment and/or speed of the user equipment,
   wherein the received signal comprises a first received signal,
   wherein the measured value of the signal propagation delay comprises a first measured value of a first signal propagation delay, and
   wherein the method further comprises:
      receiving a second received signal from the user equipment, before receiving the first received signal from the user equipment;
      measuring a second measured value of a second signal propagation delay of the second received signal; and
      comparing the first measured value of the first signal propagation delay with the second measured value of the second signal propagation delay.

2. The method according to claim 1, wherein the step of sending the measured value of the signal propagation delay is performed using a radio resource control protocol or a medium access protocol.

3. The method according to claim 1, wherein the base station comprises an evolved node B, eNodeB, and the wireless communication system comprises an Evolved Universal Terrestrial Radio Access Network, E-UTRAN.

4. The method according to claim 1, wherein the base station comprises a NodeB and the wireless communication system comprises a Universal Terrestrial Radio Access Network, UTRAN.

5. The method according to claim 1, wherein the user equipment is represented by a mobile telephone.

6. The method of claim 1, wherein sending the measured value of the signal propagation delay at the periodicity comprises:
   sending the measured value of the signal propagation delay at a faster periodicity in response to the determined magnitude of the position change of the user equipment and/or the speed of the user equipment exceeding a threshold.

7. The method of claim 6, wherein sending the measured value of the signal propagation delay at the periodicity comprises:
   sending the measured value of the signal propagation delay at a slower periodicity in response to the speed of the user equipment decreasing.

8. A method in a base station, for sending a value of a propagation delay of a signal sent to the base station from a user equipment that is associated with a location point, the base station and the user equipment are comprised within a wireless communication system and are adapted to exchange wireless signals, the method comprising the steps of:
   receiving a signal sent from the user equipment, associated with the location point;
   measuring the value of the signal propagation delay of the received signal;
   determining whether a measurement of signal propagation delay exceeds a threshold value or whether a position change of the user equipment exceeds another threshold value; and
   sending the measured value of the signal propagation delay from the base station to the user equipment and/or to a positioning node comprised within the wireless communication system, wherein the step of sending the measured value of the signal propagation delay from the base station to the user equipment and/or to the positioning node is performed in response to a defined triggering event, wherein the defined triggering event is responsive to the determination that the measurement of signal propagation delay exceeds the threshold value or that the position change of the user equipment exceeds the another threshold value, wherein the received signal comprises a first received signal, wherein the measured value of the signal propagation delay comprises a first measured value of a first signal propagation delay, and wherein the method further comprises:
receiving a second received signal from the user equipment, before receiving the first received signal from the user equipment;
measuring a second measured value of a second signal propagation delay of the second received signal; and
comparing the first measured value of the first signal propagation delay with the second measured value of the second signal propagation delay.

9. A method in a base station, for sending a value of a propagation delay of a signal sent to the base station from a user equipment that is associated with a location point, the base station and the user equipment are comprised within a wireless communication system and are adapted to exchange wireless signals, the method comprising the steps of:
receiving a signal sent from the user equipment, associated with the location point;
measuring the value of the signal propagation delay of the received signal;
determining whether a threshold delay limit value is exceeded; and
sending the measured value of the signal propagation delay from the base station to the user equipment and/or to a positioning node comprised within the wireless communication system, wherein:
the step of sending the measured value of the signal propagation delay from the base station to the user equipment and/or to the positioning node is performed periodically while the threshold delay limit value is determined to be exceeded; and
the step of sending the measured value of the signal propagation delay from the base station to the user equipment and/or to the positioning node is performed in response to a defined triggering event while the threshold delay limit value is determined to be not exceeded,
wherein the received signal comprises a first received signal,
wherein the measured value of the signal propagation delay comprises a first measured value of a first signal propagation delay, and
wherein the method further comprises:
receiving a second received signal from the user equipment, before receiving the first received signal from the user equipment;
measuring a second measured value of a second signal propagation delay of the second received signal; and
comparing the first measured value of the first signal propagation delay with the second measured value of the second signal propagation delay.

10. The method according to claim 9, wherein the threshold delay limit value is defined responsive to signal propagation delay, magnitude of a position change of the user equipment, or speed of the user equipment.

11. The method of claim 10, wherein sending the measured value of the signal propagation delay periodically comprises:
sending the measured value of the signal propagation delay at a faster periodicity in response to the magnitude of the position change of the user equipment and/or the speed of the user equipment exceeding the threshold delay limit value.

12. The method of claim 11, wherein sending the measured value of the signal propagation delay periodically comprises:
sending the measured value of the signal propagation delay at a slower periodicity in response to the speed of the user equipment decreasing.

13. An arrangement in a base station for sending a value of a propagation delay of a signal sent to the base station from a user equipment that is associated with a location point, the base station and the user equipment are comprised within a wireless communication system and are adapted to exchange wireless signals, the arrangement in the base station comprises:
a receiving unit adapted to receive a signal sent from the user equipment and is associated with the location point;
a measurement unit adapted to measure the value of the signal propagation delay of the received signal and to determine magnitude of a position change of the user equipment and/or speed of the user equipment; and
a sending unit adapted to send the measured value from the base station to the user equipment and/or to a positioning node comprised within the wireless communication system, wherein the sending unit is further adapted to send the measured value of the signal propagation delay from the base station to the user equipment and/or to the positioning node at a periodicity which is determined based on the determined magnitude of the position change of the user equipment and/or speed of the user equipment,
wherein the received signal comprises a first received signal,
wherein the measured value of the signal propagation delay comprises a first measured value of a first signal propagation delay,
wherein the receiving unit is adapted to receive a second received signal from the user equipment, before receiving the first received signal from the user equipment,
wherein the measurement unit is adapted to measure a second measured value of a second signal propagation delay of the second received signal, and
wherein the arrangement further comprises a processor configured to compare the first measured value of the first signal propagation delay with the second measured value of the second signal propagation delay.

14. The arrangement of claim 13, wherein the sending unit is adapted to send the measured value of the signal propagation delay at a faster periodicity in response to the determined magnitude of the position change of the user equipment and/or the speed of the user equipment exceeding a threshold.

15. The arrangement of claim 14, wherein the sending unit is adapted to send the measured value of the signal propagation delay at a slower periodicity in response to the speed of the user equipment decreasing.

* * * * *